United States Patent Office 2,945,021
Patented July 12, 1960

---

2,945,021

MONOAZO AND DISAZO TRIAZINE DYES

Alfred Fasciati, Bottmingen, Raymond Gunst, Binningen, Henri Riat, Arlesheim, and Karl Seitz, Neu-Allschwil, Switzerland, assignors to Ciba Limited, Basel, Switzerland, a Swiss firm No Drawing. Filed Sept. 9, 1957, Ser. No. 682,582
Claims priority, application Switzerland Sept. 14, 1956
14 Claims. (Cl. 260—153)

This invention provides valuable new azo-dyestuffs, which contain at least two strongly acid groups imparting solubility in water and a 2-halogen-4-amino-1:3:5-triazine radical, which is bound in the 6-position through an amino bridge, advantageously an amino bridge of the formula (1)
$$-\underset{\underset{C_{n-1}H_{2n-1}}{|}}{N}-$$

to the radical of a diazo-component, in which $n$ represents a positive whole number and of which the amino group bound in the 4-position of the triazine nucleus is a free amino group or the radical of an amine which contains at most 12 carbon atoms and, if it contains an aromatic ring, also contains an acid group imparting solubility in water, namely, a carboxylic acid and/or sulfonic acid group.

The invention provides more especially dyestuffs which contain at least two sulfonic acid groups and correspond to the formula.

(2)      $X-NH-D_1-N=N-A_1$ in which X represents a 2-chloro-4-amino-1:3:5-triazine radical, $D_1$ represents the radical of a diazo-component which may contain an azo linkage, and $A_1$ represents the radical of a coupling component, and in which the amino group bound in the 4-position of the triazine nucleus contains at most 12 carbon atoms and, if it contains an aromatic ring, also contains a sulfonic acid and/or carboxylic acid group.

The characteristic triazine grouping is bound in the dyestuff molecule to the radical of the diazo-component through an amino bridge which is bound directly or through a bridge member, for example, through an alkylene radical or an —SO$_2$— group, to the radical D of a diazo-component. The radical D may be an unsubstituted phenylene radical or a methyl-, alkoxy-, chloro- or nitrophenylene radical, or a larger radical, for example, a naphthalene radical or a bicyclic radical which may contain an azo linkage.

In addition to the above defined triazine grouping the dyestuffs of this invention contain at least two strongly acid groups imparting solubility in water, such as carboxylic acid groups or above all sulfonic acid groups. Advantageously, the dyestuffs contain more than one such group per azo linkage, that is to say, at least two such groups in a monoazo-dyestuff and at least three such groups in a disazo-dyestuff. These groups imparting solubility in water may be distributed in any manner in the dyestuff molecule, but one such group must be present in the triazine radical, if the latter contains an arylamino group.

The dyestuffs of this invention can be made by starting from an appropriate dyestuff, obtainable by methods in themselves known, which contains a dihalogen-, and especially a 2:4-dichloro-1:3:5-triazine radical, and reacting one of the two chlorine atoms, in the dichlorotriazine dyestuff with ammonia or with an amine which contains at most twelve carbon atoms and, if it contains an aromatic nucleus, also contains a carboxylic acid or sulfonic acid group. The dihalogen-triazine dyestuffs to be used as starting materials can be made by methods in themselves known by reacting an azo-dyestuff, which contains at least two strongly acid groups imparting solubility in water and an acylatable amino-group in the radical of the diazo component, with cyanuric chloride (2:4:6-trichloro-1:3:5-triazine) in at least equimolecular proportions, or those starting dyestuffs can be obtained from dyestuff components which contain the appropriate dichlorotriazine residue.

For preparing the azo-dyestuffs used as starting materials, which contain the acylatable amino group in the diazo-component, there may be used, for example, diazo-components of monoacyl-derivatives of aromatic diamines, for example, monoacyl-derivatives of 4:4'-diamino-diphenyl-3-sulfonic acid, 4:4'-diaminostilbene-2:2'-disulfonic acid, 4-(4'-aminobenzoylamino)-1-aminobenzene-2-sulfonic acid, 1:3- or 1:4-diaminobenzene, 1:4-diaminobenzene-2-carboxylic acid, 1:3-diaminobenzene-4-sulfonic acid or 1:4-diaminobenzene-3-sulfonic acid, 2-methoxy-1:4-diaminobenzene-5-sulfonic acid, of which the acyl radicals are hydrolyzed, after the coupling, to liberate the amino group.

As coupling components for this purpose there may be used compounds capable of coupling, which are free from acylatable amino groups, for example, β-keto-carboxylic acid esters or amides capable of coupling in the α-position, for example, acetoacetic acid arylides, pyrazolones, especially 5-pyrazolones, capable of coupling in the 4-position, such as 3-methyl-5-pyrazolone, 1-phenyl-3-methyl-5-pyrazolone, 1-phenyl-3-methyl-5-pyrazolone-2'-, -3'- or -4'-sulfonic acid, 1-phenyl-5-pyrazolone-3-carboxylic acid, 5-pyrazolone-3-carboxylic acid amide, barbituric acids, hydroxyquinolines such as 8-hydroxyquinoline, 2:4-dihydroxyquinoline and phenols, such as para-cresol, 4-acetylamino-1-hydroxybenzene, 4-methyl-2-acetylamino-1-hydroxybenzene, 2-carboxy-1-hydroxybenzene, naphthols such as α- or β-naphthol, α- or β-naphthyl-amine, 2-hydroxynaphthalene sulfonic acid amide, and above all amino and/or hydroxynaphthalene sulfonic acids or their N-alkyl- or N-aryl-derivatives, such as 1-hydroxynaphthalene-3-, -4-, -5- or -8-sulfonic acid, 2-hydroxynaphthalene-4-, -5-, -6-, -7- or -8-sulfonic acid, 1:8-dihydroxynaphthalene-3:6-disulfonic acid, 2-hydroxynaphthalene-3:6- or -6:8-disulfonic acid, 1-hydroxynaphthalene-3:6- or 3:8-disulfonic acid, 2-aminonaphthalene-6-sulfonic acid, 1-amino-8-hydroxynaphthalene-2:4-, -3:6- or -4:6-disulfonic acid and N-acyl-derivatives of aminonaphthol sulfonic acids which contain as an acyl radical, for example, an acetyl, propionyl, butyryl, chloracetyl, benzoyl, ortho-, meta- or para-chlorobenzoyl, nitrobenzoyl, tertiary-butyl-benzoyl, 3'- or 4'-aminobenzoyl, methane or ethane sulfonyl, para-toluene sulfonyl or chlorobenzene sulfonyl group or a carbomethoxy or carbethoxy group or an acyl radical derived from a cyanuric acid for example, a radical of the formula

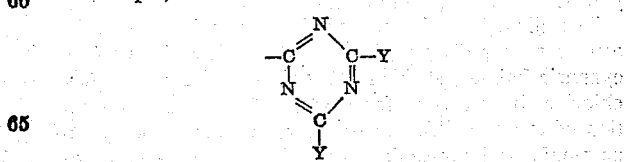

in which both substituents Y represent halogen atoms or hydroxyl groups or amino groups, especially substituted amino groups. There may also be used as coupling components 5:5'-dihydroxy-2:2'-dinaphthyl-urea-7:7'-disulfonic acid or 5:5'-dihydroxy-2:2'-dinaphthylamine-7:7'- disulfonic acid, which coupling components, like 1-amino-8-hydroxynaphthalene-3:6-disulfonic acid, may, if desired, be coupled twice with the aforesaid diazo-components, and also compounds capable of coupling which contain an azo linkage, for example, monoazo-compounds obtainable, for example, by coupling a simple diazo-compound of the benzene or naphthalene series (for example, diazotized naphthylamine, anilines, such as chloro- or nitro-anilines, toluidines, aminobenzene sulfonic acids, chloro- or nitro-aminobenzene sulfonic acids, aminobenzoic acids, nitro-amino-benzoic acids or nitroaminophenols, etc.) in an acid medium with 2-amino-5-hydroxynaphthalene-7-sulfonic acid, or 1-hydroxy-8-aminonaphthalene-3:6-disulfonic acid.

In this case also there are coupled together only such starting materials as lead to the formation of amino-azo-dyestuffs containing at least two groups imparting solubility in water.

The condensation of the amino-azo-dyestuffs obtained from these components and containing in the radical of the diazo-component an acylatable amino group with cyanuric chloride is carried out in such manner that two exchangeable halogen atoms remain in the condensation product obtained, and one of which halogen atoms is exchanged in the process of this invention for the radical of an amino-compound of the kind defined above. As such amino compounds there are used, apart from ammonia, amines such as methylamine, dimethylamine, ethylamine, diethylamine, isopropylamine, butylamine, hexylamine or cyclohexylamine, and also β-chlorethylamine, methoxyethylamine, γ-methoxy-propylamine, ethanolamine, propanolamine and acylatable amines such as acetamide, butyric acid amide, urea, thiourea and toluene sulfonic acid amide, and also glycine, aminocarbonic acid esters, such as the methyl or ethyl ester, aminoacetic acid ethyl ester, amino-acetamide, hydrazine, phenylhydrazine sulfonic acids, thiosemicarbazide, and 1-aminobenzene-2:5-disulfonic acid, 1-aminobenzene-2-, -3- or -4-sulfonic acid, aminonaphthalene mono- or di-sulfonic acid, amino-diphenylsulfonic acids, β-aminoethane sulfonic acid and N-methyl-aminoethane sulfonic acid.

The condensation of these amino-compounds with dihalogen-triazine dyestuffs is advantageously carried out with the use of an acid-binding agent such as sodium acetate, sodium carbonate or sodium hydroxide and under conditions such that the final product contains an exchangeable halogen atom, that is to say, for example, in an organic solvent or at a relatively low temperature in an aqueous medium.

The azo-dyestuffs of this invention can also be made by a modification of the process described above. In this modification the azo-dyestuff used as starting material for preparing the dichloro-triazine dyestuff, and which contains at least two strongly acid groups imparting solubility and an acylatable amino group in the radical of the diazo-component for example, an amino-azo dyestuff obtainable from the components mentioned above, is condensed with a 4:6-dihalogen-1:3:5-triazine which contains in the 2-position a free amino group or the radical of an amine containing at most 12 carbon atoms, and which, if it contains an aromatic ring, also contains an acid group imparting solubility in water, namely a carboxylic acid and/or sulfonic acid group.

The dihalogen-triazines of the aforesaid constitution can be prepared by methods in themselves known from cyanuric halides, such as cyanuric bromide or cyanuric chloride, by reacting, for example 1 molecular proportion of cyanuric chloride with 1 molecular proportion of ammonia or 1 molecular proportion of an amine of the kind described above. In order to prepare the azo-dyestuffs of this invention the dihalogen-triazine compounds so obtained are condensed with amino-azo-dyestuffs of the kind defined above, which contain two strongly acid groups imparting solubility in water and an acylatable amino group in the radical of the diazo component, or advantageously with the diazo-components which are suitable for making the aforesaid dyestuffs and which contain an acylatable amino group in addition to the group capable of leading to dyestuff formation.

As examples of diazo-components so obtainable, which contain a triazine radical of the above kind, there may be mentioned the secondary condensation products of one molecular proportion of cyanuric chloride with one molecular proportion of ammonia or an aminobenzene sulfonic acid and one molecular proportion of 4:4'-diaminodiphenyl-3 - sulfonic acid, 4:4'-diaminostilbene-2:2'-disulfonic acid, 4-(4'-aminobenzoylamino)-1-aminobenzene-2-sulfonic acid, 1:3- or 1:4-diaminobenzene, 1:4-diaminobenzene-2-carboxylic acid, 1:3-diaminobenzene-4-sulfonic acid of 1:4-diaminobenzene-3-sulfonic acid, 2-methoxy-1:4-diaminobenzene-5-sulfonic acid and the secondary condensation products of the formulae

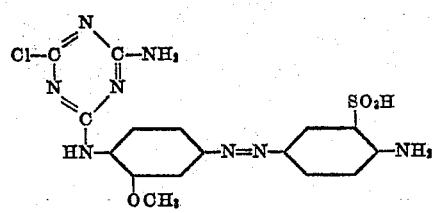

and

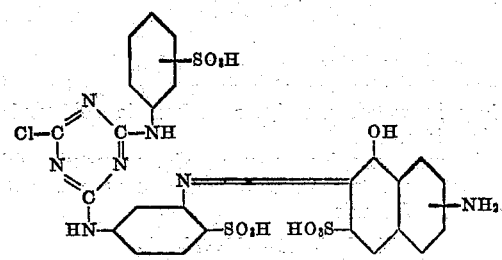

In making the dyestuffs of this invention by condensing one of the aforesaid amino-azo-dyestuffs with cyanuric chloride and with a simpler amino-compound of the kind defined above, it is generally possible to carry out the steps of the condensation in either order of succession. On the other hand, in making the dyestuffs by the coupling procedure it is generally of advantage to carry out the condensations required for making the secondary condensation product to be used as diazo-component by first forming the monoamino-dihalogen-triazine and subsequently condensing it with the required diazo component.

Notwithstanding the presence of a labile halogen atom in the dyestuffs of this invention they can be isolated and worked up into useful dry dyestuff preparations, without losing their valuable properties. The dyestuffs are advantageously isolated at as low a temperature as possible by salting out and filtration. The filtered dyestuffs may be dried, if desired, after the addition of an extender. The drying is preferably carried out at not too high a temperature and under reduced pressure. In certain cases dry preparations can be obtained directly by spray drying the entire mixture in which the dyestuff is prepared, that is to say, without isolating the dyestuff.

The new dyestuffs are suitable for dyeing or printing a very wide variety of materials, especially cellulose-containing materials of fibrous structure, such as linen, regenerated cellulose and above all cotton. They are especially well suited for dyeing by the so-called pad dyeing process, in which the goods are impregnated with an aqueous solution of the dyestuff, which may also contain a salt, and the dyestuff is fixed on the material with the aid of heat after treatment with an alkali or in the presence of an alkali. This process and the direct dyeing method, which can be used with many of the dyestuffs of this invention, and also printing processes yield dyeings or prints which are generally distinguished by the purity of their tints, their good fastness to light and above all their excellent fastness to washing.

When the dyestuffs contain groups capable of forming metal complexes, for example, ortho:ortho'-dihydroxy-azo-groupings or ortho:ortho'-hydroxy-carboxy-groupings such as are present, for example, in salicylic acid radicals, the dyeings obtained with these dyestuffs may be treated with an agent yielding metal, for example, an agent yielding chromium, or advantageously an agent yielding nickel or copper. The treatment with the agent yielding metal may be carried out by methods in themselves known. If desired, very valuable dyeings can be obtained by the process in which a dyeing produced with the metal-free dyestuff is after-treated with an aqueous solution which contains a water-soluble copper compound, especially a water-soluble complex copper compound, and a basic formaldehyde condensation product of a compound containing at least once the atomic grouping

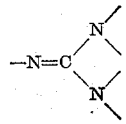

or of a compound, such as cyanamide, which is easily convertible into a compound containing such an atomic grouping.

The following examples illustrate the invention, the parts and percentages being by weight:

Example 1

31.65 parts of the secondary condensation product from 1 mol of cyanuric chloride, 1 mol of 1:3-diaminobenzene-4-sulfonic acid and 1 mol of ammonia are stirred in 300 parts of water, 300 parts of ice and 20 parts of hydrochloric acid of 30% strength, and diazotized at 0–2° C. with 25 molar parts of a 4N-solution of sodium nitrite. To the diazo-suspension so obtained, which is acid to Congo, there are added 30 parts of sodium acetate $$(CH_3CO_2Na.3H_2O)$$

and then the mixture is added to a solution, cooled to 0–2° C., of 42.3 parts of 1-benzoylamino-8-hydroxynaphthalene-3:6-disulfonic acid (present as the alkali metal salt), in 400 parts of water and 15 parts of calcined sodium carbonate. When the coupling is complete the dyestuff is precipitated by the addition of potassium chloride, filtered off, washed with potassium chloride solution, and dried at 70° C. in vacuo. It dissolves in cold water with a bluish red coloration and dyes cellulose fibers by the so-called pad dyeing process fast bluish red tints. By the same method similar dyestuffs are obtained by coupling the secondary condensation products mentioned in column I of the following table with the coupling components given in column II, and which dyestuffs dye cotton by the so-called pad dyeing process the tints given in column III, which have good properties of wet fastness.

| | I | II | III |
|---|---|---|---|
| 1 | H₂N–C(=N)–C(–NH–⟨C₆H₄⟩–SO₃H)(NH₂)–N=C(Cl)–N | HO, NH–COCH₃ naphthalene with HO₃S– and –SO₃H | red. |
| 2 | H₂N–C(=N)–C(–NH–⟨C₆H₄⟩–SO₃H)(NH₂)–N=C(Cl)–N | HO, O–C₂H₅ naphthalene with HO₃S– and –SO₃H | Do. |
| 3 | HO₃S–⟨C₆H₄⟩–NH–C(=N)–C(–NH–⟨C₆H₄⟩–SO₃H)(NH₂)–N=C(Cl)–N | HO, Cl; HOC=N–⟨C₆H₃Cl⟩–SO₃H; C=N–CH₃ | yellow. |
| 4 | H₂N–C(=N)–C(–NH–⟨C₆H₄⟩–SO₃H)(NH₂)–N=C(Cl)–N | HO, SO₃H naphthalene, NH–COCH₃ | bluish red. |
| 5 | H₂N–C(=N)–C(–NH–⟨C₆H₄⟩–SO₃H)(NH₂)–N=C(Cl)–N | HO, HOC=N–⟨C₆H₄⟩–SO₃H, C=N–CH₃ | yellow. |
| 6 | H₂N–C(=N)–C(–NH–⟨C₆H₄⟩–SO₃H)(NH₂)–N=C(Cl)–N | HO–naphthalene–NH–COCH₃, SO₃H | red. |

| | I | II | III |
|---|---|---|---|
| 7 | H₂N-C(=N)-N=C(Cl)-N=C-NH-C₆H₃(SO₃H)(NH₂) [2-amino-4-chloro-6-(4-sulfo-3-aminoanilino)-s-triazine] | 1-hydroxy-8-acetamido-naphthalene-3,6-disulfonic acid derivative (HO, NH-COCH₃, HO₃S, SO₃H) | red. |
| 8 | H₂N-C(=N)-N=C(Cl)-N=C-NH-C₆H₃(SO₃H)(NH₂) | 1-hydroxy-8-anilino-naphthalene-sulfonic acid (HO, NH-phenyl, SO₃H) | red violet. |
| 9 | H₂N-C(=N)-N=C(Cl)-N=C-NH-C₆H₃(SO₃H)(NH₂) | 1-hydroxy-8-benzamido-naphthalene-3,6-disulfonic acid (HO, NH-CO-phenyl, HO₃S, SO₃H) | bluish red. |
| 10 | C₆H₄(SO₃H)-NH-C=N-C(Cl)=N-C=N-NH-C₆H₃(SO₃H)(NH₂) | HO, HO₃S-naphthalene-NH-CO-NH₂ | orange. |
| 11 | H₂N-C(=N)-N=C(Cl)-N=C-NH-C₆H₃(SO₃H)(NH₂) | pyrazolone with CH₂-C-COOH, O=C, N-N, phenyl-NO₂ | yellow. |
| 12 | H₃C-NH-C=N-C(Cl)=N-C-NH-C₆H₃(SO₃H)(NH₂) | pyrazolone with CH₂-C-COOH, O=C, N-N, phenyl-NO₂ | Do. |
| 13 | H₂N-C=N-C(Cl)=N-C-NH-C₆H₃(SO₃H)(NH₂) | HO, NH-COCH₃, HO₃S-naphthalene | scarlet. |
| 14 | C₆H₄(CO₂H)-NH-C=N-C(Cl)=N-C-NH-C₆H₃(SO₃H)(NH₂) | OH, NH-CO-phenyl, HO₃S, SO₃H-naphthalene | strong bluish red. |
| 15 | H₂N-CO-NH-C=N-C(Cl)=N-C-NH-C₆H₃(SO₃H)(NH₂) | OH, NH-CO-phenyl, HO₃S, SO₃H-naphthalene | Do. |

| | I | II | III |
|---|---|---|---|
| 16 | H₅C₂-NH-C(=N-)N=C(Cl)-N=C-NH-C₆H₃(NH₂)(SO₃H) (triazine with ethylamino, chloro, and aminobenzenesulfonic acid substituents) | 1-hydroxy-4-(cyclohexanecarbonylamino)naphthalene-3,6-disulfonic acid derivative (OH, NH-CO-C₆H₅; HO₃S, SO₃H on naphthalene) | strong bluish red. |
| 17 | HO₃S-C₆H₃(CO₂H)-NH-C(=N)-N=C(Cl)-N=C-NH-C₆H₃(NH₂)-SO₃H | 1-hydroxy-4-acetylamino naphthalene-sulfonic acid (HO, NH-CO-CH₃, HO₃S) | red-orange. |
| 18 | HO₃S-C₆H₃(CO₂H)-NH-C(=N)-N=C(Cl)-N=C-NH-C₆H₃(NH₂)-SO₃H | 8-hydroxyquinoline-sulfonic acid derivative (HO₃S, HO, N) | reddish yellow. |
| 19 | HO₃S-C₆H₃(CO₂H)-NH-C(=N)-N=C(Cl)-N=C-NH-C₆H₃(NH₂)-SO₃H | 1-hydroxy-6-amino-naphthalene sulfonic acid (HO, NH₂, HO₃S) | scarlet. |
| 20 | HO₃S-C₆H₃(CO₂H)-NH-C(=N)-N=C(Cl)-N=C-NH-C₆H₃(NH₂)-SO₃H | pyrazolone carboxylic acid (OH, C-NH, CH, C=N, COOH) | yellow. |
| 21 | HO₃S-C₆H₃(CO₂H)-NH-C(=N)-N=C(Cl)-N=C-NH-C₆H₃(NH₂)-SO₃H | pyrazolone with dichlorophenylsulfonic acid substituent (HO, C-N-C₆H₃Cl₂-SO₃H, CH₃) | Do. |
| 22 | HO₃S-C₆H₄-NH-C(=N)-N=C(Cl)-N=C-NH-C₆H₃(NH₂)-SO₃H | 1-hydroxy-4-(cyclohexanecarbonylamino)naphthalene-3,6-disulfonic acid (OH, NH-CO-C₆H₅; HO₃S, SO₃H) | strongly bluish red. |
| 23 | HO₃S-C₆H₄-NH-C(=N)-N=C(Cl)-N=C-NH-C₆H₃(NH₂)-SO₃H | 1-hydroxy-4-(2-chlorobenzoylamino)naphthalene-disulfonic acid (OH, NH-CO-C₆H₄Cl, HO₃S, SO₃H) | bluish red. |
| 24 | HO₃S-C₆H₄-NH-C(=N)-N=C(Cl)-N=C-NH-C₆H₃(NH₂)-SO₃H | pyrazolone-naphthalene sulfonic acid (HO, HC, C=N, CH₃, SO₃H) | yellow. |

| | I | II | III |
|---|---|---|---|
| 25 | [structure with SO₃H, NH-C, triazine with Cl, NH, SO₃H, NH₂] | [naphthalene with OH, NH-CO-phenyl(Cl), HO₃S, SO₃H] | bluish red. |
| 26 | [structure with COOH, NH-C, triazine with Cl, NH, SO₃H, NH₂] | [naphthalene with OH, NH-CO-phenyl(Cl), HO₃S, SO₃H] | Do. |
| 27 | [structure with SO₃H, NH-C, triazine with Cl, NH, NH₂, SO₃H] | [naphthalene with HO₃S, NH-CO-NH₂, OH] | red. |
| 28 | [structure with NH-C, triazine with Cl, SO₃H, NH, NH₂, SO₃H] | [naphthalene with HO₃S, NH-CO-CH₃, OH] | Do. |
| 29 | [structure with NH-C, triazine with Cl, SO₃H, NH, NH₂, SO₃H] | [naphthalene with HO, NH-CO-phenyl, HO₃S, SO₃H] | violet. |
| 30 | HO₃S-[phenyl]-NH-C, triazine with Cl, NH-[phenyl]-NH₂, SO₃H | [naphthalene with HO, NH₂, HO₃S] (alkaline coupling) | orange. |
| 31 | HO₃S-[phenyl]-NH-C, triazine with Cl, NH-[phenyl]-NH₂, SO₃H | [naphthalene with HO, NH₂, HO₃S] (acid-coupling) | red. |
| 32 | H₂N-C, triazine with Cl, NH-[phenyl]-NH₂, SO₃H | [pyrazolone-naphthalene with HO, C-N, HC, C=N, CH₃, SO₃H, SO₃H] | yellow. |
| 33 | H₂N-C, triazine with Cl, NH-[phenyl]-NH₂, SO₃H | [pyrazolone-naphthalene with HO, C-N, HC, C=N, CH₃, SO₃H, SO₃H] | Do. |

| | I | II | III |
|---|---|---|---|
| 34 | [naphthalene-SO₃H]-NH-C(triazine, Cl)-NH-[benzene-SO₃H, NH₂] | [naphthalene with HO, NH-CO-C₆H₅, HO₃S, SO₃H] | violet. |
| 35 | [naphthalene-SO₃H]-NH-C(triazine, Cl)-NH-[benzene-SO₃H, NH₂] | [naphthalene with H₂N, OH, SO₃H] (acid coupling) | red. |
| 36 | [naphthalene-SO₃H]-NH-C(triazine, Cl)-NH-[benzene-SO₃H, NH₂] | HO-C(-HC=)-N-[C₆H₄-NO₂], C(COOH)=N (pyrazolone) | yellow. |
| 37 | [naphthalene-SO₃H]-NH-C(triazine, Cl)-NH-[benzene-SO₃H, NH₂] | HO-C(-HC=)-N-[C₆H₄-NO₂], C(COOH)=N | greenish yellow. |
| 38 | HO₃S-[C₆H₄]-[C₆H₄]-NH-C(triazine, Cl)-NH-[C₆H₃, NH₂, SO₃H] | HO-C(-HC=)-N-[C₆H₄-NO₂], C(COOH)=N | blue red. |
| 39 | HO₃S-[C₆H₄]-[C₆H₄]-NH-C(triazine, Cl)-NH-[C₆H₃, NH₂, SO₃H] | [naphthalene with HO, NH-CO-C₆H₅, HO₃S, SO₃H] | Do. |
| 40 | HO₃S-[C₆H₄]-NH-C(triazine, Cl)-NH-[C₆H₃, COOH, NH₂] | [naphthalene with HO, NH-CO-C₆H₅, HO₃S, SO₃H] | violet. |
| 41 | HO₃S-[C₆H₄]-NH-C(triazine, Cl)-NH-[C₆H₃, COOH, NH₂] | HO-C(-HC=)-N-[C₆H₄-SO₃H], C(CH₃)=N | yellow. |

| | I | II | III |
|---|---|---|---|
| 42 | H₂N–C(=N)–N=C(Cl)–N=C–NH–C₆H₃(NH₂)(SO₃H) | 1-hydroxy-naphthalene-6-sulfonic acid (HO-naphthalene-SO₃H) | orange. |
| 43 | H₂N–C(=N)–N=C(Cl)–N=C–NH–C₆H₃(NH₂)(SO₃H) | 1-hydroxy-naphthalene-5-sulfonic acid | scarlet. |
| 44 | H₂N–C(=N)–N=C(Cl)–N=C–NH–C₆H₃(NH₂)(SO₃H) | 1-hydroxy-naphthalene-3,6-disulfonic acid | orange. |
| 45 | H₂N–C(=N)–N=C(Cl)–N=C–NH–C₆H₃(NH₂)(SO₃H) | 1-hydroxy-naphthalene-2,4-disulfonic acid type | Do. |
| 46 | H₂N–C(=N)–N=C(Cl)–N=C–NH–C₆H₃(NH₂)(SO₃H) | 1-hydroxy-naphthalene-3,5-disulfonic acid type | scarlet. |
| 47 | H₂N–C(=N)–N=C(Cl)–N=C–NH–C₆H₃(NH₂)(SO₃H) | 2-hydroxy-naphthalene-5-sulfonic acid | Do. |
| 48 | H₂N–C(=N)–N=C(Cl)–N=C–NH–C₆H₃(NH₂)(SO₃H) | 2-Hydroxynaphthalene-6-sulfonic acid | orange. |
| 49 | H₂N–C(=N)–N=C(Cl)–N=C–NH–C₆H₃(NH₂)(SO₃H) | 2-Hydroxynaphthalene-3:6-disulfonic acid | scarlet. |
| 50 | H₂N–C(=N)–N=C(Cl)–N=C–NH–C₆H₃(NH₂)(SO₃H) | 6-Chloro-2-hydroxynaphthalene-4-sulfonic acid | yellowish red. |
| 51 | H₂N–C(=N)–N=C(Cl)–N=C–NH–C₆H₃(NH₂)(SO₃H) | 1-hydroxy-2-amino-6-sulfo-3-(4'-nitrophenylazo)-naphthalene-? -sulfonic acid | blue. |

| | I | II | III |
|---|---|---|---|
| 52 | (chemical structure: H₂N-C triazine with Cl, NH-phenyl(NH₂)(SO₃H)) | (chemical structure: naphthalene-OH, CO-NH-phenyl-SO₃H) | red. |
| 53 | (chemical structure: phenyl(SO₃H)-NH-triazine(Cl)-NH-phenyl(NH₂)(SO₃H)) | (chemical structure: HO₃S-naphthalene-OH, NH-CO-NH₂) | orange. |
| 54 | (chemical structure: HO₃S-CH₂CH₂-NH-triazine(Cl)-NH-phenyl(NH₂)(SO₃H)) | (chemical structure: pyrazolone with SO₃H-naphthalene) | reddish yellow. |
| 55 | (chemical structure: HO₃S-CH₂CH₂-NH-triazine(Cl)-NH-phenyl(NH₂)(SO₃H)) | (chemical structure: HO-naphthalene-NHCOCH₃, HO₃S, SO₃H) | bluish red. |
| 56 | (chemical structure: H₂N-triazine(Cl)-NH-biphenyl(SO₃H)(NH₂)) | (chemical structure: HO-naphthalene-NHCOCH₃, HO₃S, SO₃H) | pure violet. |
| 57 | (chemical structure: morpholino-triazine(Cl)-NH-phenyl(NH₂)(SO₃H)) | (chemical structure: pyrazolone with dichlorophenyl-SO₃H) | yellow. |
| 58 | (chemical structure: HOCH₂-NH-triazine(Cl)-NH-phenyl(NH₂)(SO₃H)) | (chemical structure: pyrazolone with dichlorophenyl-SO₃H) | Do. |
| 59 | (chemical structure: CH₃O-CH₂CH₂-NH-triazine(Cl)-NH-phenyl(NH₂)(SO₃H)) | (chemical structure: pyrazolone with dichlorophenyl-SO₃H) | Do. |

Example 2

8.76 parts of the dyestuff of the formula

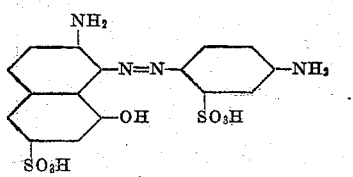

are dissolved in the form of the sodium salt in 300 parts of water, and 3.18 parts of sodium carbonate are added. The solution is cooled to 0–5° C. and there is added a solution of 3.7 parts of cyanuric chloride in 50 parts of acetone. The whole is stirred for 2–3 hours at 0–5° C., then 50 parts of an aqueous solution containing 0.8 part of ammonia are added, and the whole is stirred for a further 2 hours at 40–45° C. The dyestuff is then salted out with 100 parts of sodium chloride.

The product is filtered off at room temperature, washed with saturated sodium chloride solution, and dried at 45° C. in vacuo. There are obtained 19.9 parts of a red powder which dyes cotton from an alkaline bath having a high concentration of a salt bluish red tints.

A dyestuff which dissolves well in water and dyes cotton bluish red tints is obtained by condensing the aminoazo-dyestuff of the above formula with the primary condensation product of 2-aminobenzene-1-sulfonic acid and cyanuric chloride. This dyestuff can also be prepared by coupling 2-amino-8-hydroxynaphthalene-6-sulfonic acid in an acid medium with the diazo-compound of the secondary condensation product obtained from 2-aminobenzene-1-sulfonic acid, cyanuric chloride and 1:4-diaminobenzene-3-sulfonic acid.

Example 3

47.25 parts of the secondary condensation product obtained from 1 mol of cyanuric chloride and 1 mol of 1-aminobenzene-2-sulfonic acid and 1 mol of 1:3-diaminobenzene-4-sulfonic acid are stirred in 300 parts of water, 300 parts of ice and 20 parts of hydrochloric acid of 30% strength, and diazotized at 8–10° C. with 25 parts by volume of a 4 N-solution of sodium nitrite.

The diazo-suspension so obtained, which is acid to Congo is then added to a solution of 23.9 parts of 2-amino-8-naphthol-6-sulfonic acid in 1200 parts of water and 60 parts of sodium acetate ($CH_3CO_2Na.3H_2O$). The whole is then stirred at 25–30° C. until the coupling is complete, and the dyestuff is precipitated by the addition of sodium chloride, filtered off, and dried in vacuo at 70–80° C. The dyestuff dissolves in water with a red coloration and dyes cellulose fibers from an alkaline bath containing a salt red tints which are fast to light and washing.

Dyestuffs having similar properties are obtained by condensing cyanuric chloride with 1:3- or 1:4-aminobenzene sulfonic acid or 1:2-, 1:3- or 1:4-aminobenzene carboxylic acid or ammonia, instead of 1-aminobenzene-2-sulfonic acid.

Example 4

31.6 parts of the triazine of the formula

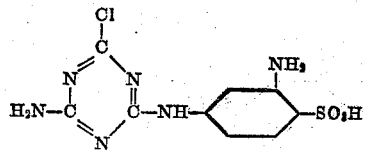

are suspended in 500 parts of water, the pH value of the suspension is adjusted to 8.5 with sodium hydroxide solution, 6.9 parts of sodium nitrite in the form of an aqueous solution are added, and the whole is poured into 50 parts of ice and 25 parts of hydrochloric acid of 30% strength. When the diazotization has ceased, coupling is carried out with 22.3 parts of 1-aminonaphthalene-7-sulfonic acid dissolved in the form of the neutral sodium salt in water. The solution is neutralized to a pH value of 4.0 with sodium acetate. When the coupling is finished, the pH value of the mixture is adjusted to 8.5 with sodium hydroxide solution, 6.9 parts of sodium nitrite are added in the form of an aqueous solution, and the whole is poured into 35 parts of hydrochloric acid of 30% strength at a temperature of 0° C. The color of the diazo-compound is orange-brown. Coupling is carried out with a solution of 28.1 parts of 2-acetylamino-8-hydroxynaphthalene-6-sulfonic acid in 200 parts of water and 50 parts of sodium carbonate. After 24 hours the dyestuff is separated and dried. It dyes cotton from a salt-containing alkaline bath weak reddish blue tints.

Instead of 2-acetylamino-8-hydroxynaphthalene-6-sulfonic acid other azo-components may be used, for example, the following:

(a) 1-acetylamino-8-hydroxynaphthalene-3:6-disulfonic acid, which yields a pure neutral blue dyestuff, (b) The triazine obtained by condensing 1 mol of cyanuric chloride with 1 mol of 1-amino-8-hydroxynaphthalene-3:6-disulfonic acid, and 1 mol of ammonia, which has the formula

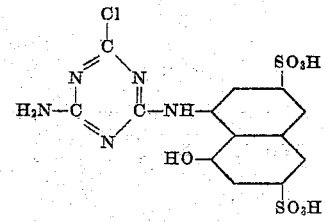

and yields a pure neutral blue dyestuff.

(c) 2 - acetylamino - 5 - hydroxynaphthalene - 7 - sulfonic acid, which yields a reddish blue dyeing dyestuff.

(d) 1-hydroxynaphthalene-4-sulfonic acid, which yields a dyestuff producing reddish navy blue tints.

(e) The pyrazolone of the formula

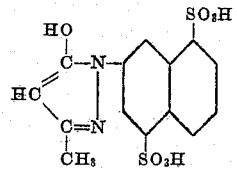

which yields a dyestuff producing reddish brown tints.

All these dyestuffs are distinguished by the excellent fastness to washing of their dyeings.

Example 5

31.6 parts of the triazine of the formula

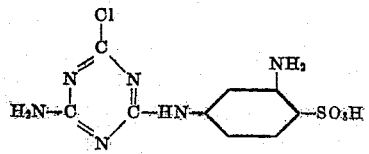

are diazotized in the manner described in Example 4. As the coupling component there is used the monoazo-dyestuff obtained in known manner by coupling diazotized 4-nitraniline-2-sulfonic acid in a mineral acid medium with 1-amino-8-hydroxynaphthalene-3:6-disulfonic acid. 54.8 parts of this monoazo-dyestuff are dissolved in 200 parts of water, 25 parts of sodium bicarbonate are added, the whole is cooled with ice to 0° C., and the diazo-suspension of the aforesaid triazine is run in while stirring vigorously. After stirring the mixture for several hours, the disazo-dyestuff formed is precipitated by the addition of sodium chloride, filtered off and dried.

The resulting dyestuff dyes cellulose fibers from strong salt-containing alkaline baths slightly greenish blue tints which are fast to washing.

A similar dyestuff is obtained by using a triazine of the above formula in which the —NH₂ group condensed to the triazine ring is replaced by the residue of 1-aminobenzene-4-sulfonic acid or the residue of 2-aminonaphthalene-4:8-disulfonic acid.

Example 6

33.6 parts of the triazine of the formula

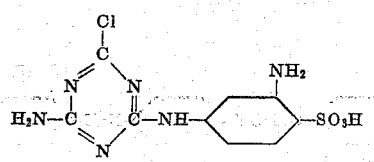

are diazotized in the manner described in Example 4, and coupled with an aqueous solution of 23.9 parts of 2-amino-5-hydroxynaphthalene-7-sulfonic acid in 500 parts of water and 30 parts of sodium carbonate. When the coupling is finished 6.9 parts of sodium nitrite are added and the whole is poured into a quantity of ice and 45 parts of hydrochloric acid of 30% strength. The diazotization of the amino-azo-dyestuff is complete after stirring the mixture for several hours. The diazo-compound so obtained is poured in a fine jet into a solution of 12.8 parts of barbituric acid in 400 parts of water and 40 parts of sodium carbonate. The dyestuff so formed is separated and dried. The dyestuff dyes cellulose fibers from an alkaline bath with a high salt concentration fast brown tints.

A similar dyestuff is obtained by using as coupling component, instead of barbituric acid, the 3-methyl-5-pyrazolone compound of 2-aminonaphthalene-4:8-disulfonic acid obtained in the usual manner and having the formula given at the end of Example 4.

Example 7

31.6 parts of the triazine of the formula

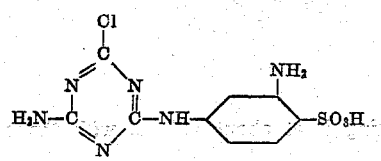

are suspended in 500 parts of water, the pH value of the mixture is adjusted to 8.5 with caustic soda solution, 6.9 parts of sodium nitrite are added in the form of an aqueous solution, and the whole is poured into 50 parts of ice and 25 parts of hydrochloric acid of 30% strength. As soon as the diazotization is finished, coupling is carried out with 22.3 parts of 1-aminonaphthalene-7-sulfonic acid dissolved in water in the form of its neutral sodium salt. The mixture is neutralized to a pH value of 4.0 with sodium acetate. When the coupling is finished, the pH value of the mixture is adjusted to 8.5 with caustic soda solution, 6.9 parts of sodium nitrite are added in the form of an aqueous solution, and the whole is poured into 35 parts of hydrochloric acid of 30% strength at 0° C. The color of the diazo-compound is orange-brown.

Coupling is carried out with a solution of 22.3 parts of 1-aminonaphthalene-7-sulfonic acid in the form of its neutral sodium salt dissolved in 300 parts of water. After 24 hours, the dyestuff is separated and dried. The dyestuff dyes cotton from salt-containing alkaline baths blue-violet tints which are fast to washing.

Example 8

78.5 parts of the disazo-dyestuff of the formula

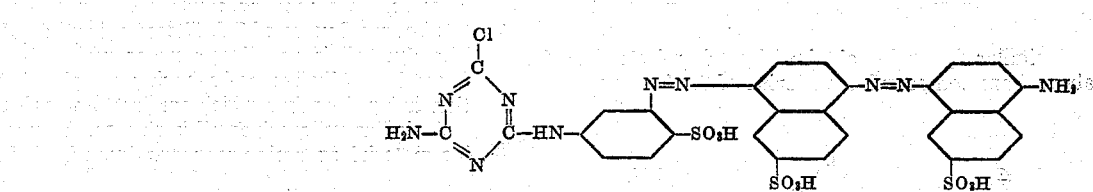

obtained by the method described in Example 7, are dissolved in 1000 parts of water with the aid of caustic soda solution at a pH value of 8.5. To the resulting solution are added 7.5 parts of sodium nitrite in the form of an aqueous solution, and the whole is poured into 35 parts of hydrochloric acid of 30% strength, and the whole is stirred for several hours at 0° C. The diazo-compound so obtained is added, for the purpose of coupling to an aqueous solution of 25 parts of 1-naphthol-4-sulfonic acid, which contains an excess of sodium carbonate. After 24 hours the trisazo-dyestuff formed is precipitated by the addition of sodium chloride, filtered off and dried. It dyes cotton from salt-containing alkaline baths dark blue tints which are very fast to washing.

Example 9

33.6 parts of the triazine of the formula

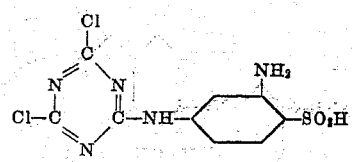

are suspended in 400 parts of water and ice, 6.9 parts of sodium nitrite are added, and 25 parts of hydrochloric acid of 30% strength are introduced. As soon as the diazotization is finished, coupling is carried out with 46.7 parts of the condensation product from 1 mol of cyanuric chloride with 1 mol of 1-amino-8-hydroxynapthalene-3:6-disulfonic acid of the formula

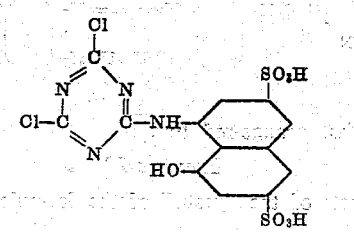

in 400 parts of water and 25 parts of sodium carbonate. As soon as the coupling is finished, 40 parts of an aqueous solution of ammonia of 17% strength, are added, the whole is heated for 2 hours at 40–45° C., and the product is separated and dried. The dyestuff so obtained dyes cellulose fibers from alkaline baths having a high concentration of a salt very pure red tints of excellent fastness to washing and light.

The same dyestuff can be obtained by using as diazo-component a triazine of the first formula given above, but in which one of the two labile chlorine atoms has been exchanged for an —NH₂ group.

Instead of the diazo-compound of the formula first given above there may be used the secondary condensation product of the formula

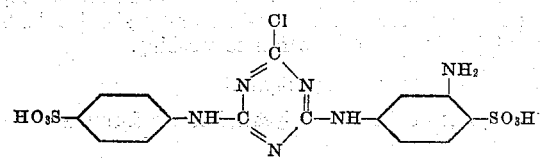

A similar dyestuff is obtained by using, instead of the above diazo-compound, the triazine of the formula

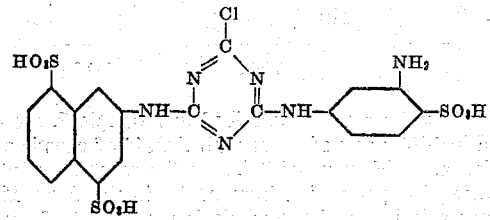

Furthermore a similar dyestuff obtained by exchanging one chlorine atom of the coupling component before coupling for an —NH₂ group by treatment with ammonia at 40° C.

Finally, there may be used, instead of 1-amino-8-hydroxynaphthalene-3:6-disulfonic acid, another amino-hydroxy-naphthalene sulfonic acid which is capable of coupling in ortho-position to the hydroxyl group and of which the amino group is capable of reacting with cyanuric chloride. Thus, the dyestuff of the formula

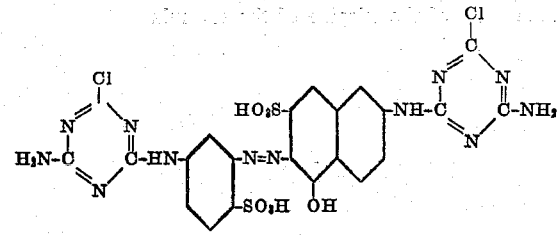

yields a pure fast orange tint, and the dyestuff of the formula

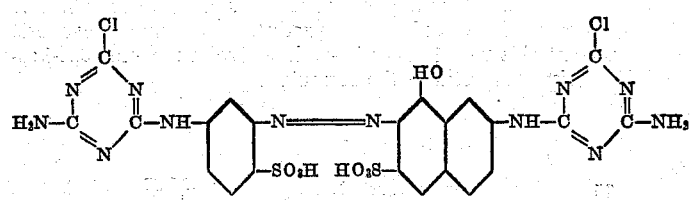

yields a fast orange-red tint.

Example 10

62.9 parts of the dyestuff of the formula

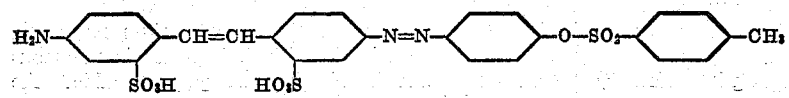

prepared in known manner by coupling diazotized 4-nitro-4'-aminostilbene-2:2'-disulfonic acid with phenol, esterifying the resulting para-hydroxy-azo-dyestuff with para-toluene sulfo-chloride and reducing the nitro-azo-dyestuff to the amino-azo-dyestuff by means of an aqueous solution of sodium hydrosulfide, are dissolved in the form of the neutral sodium salt in 400 parts of water. The resulting solution is added, while stirring vigorously, at 0° C. to a reprecipitated fine suspension of 18.5 parts of cyanuric chloride in water. By simultaneously introducing dropwise a 1 N-solution of sodium hydroxide the pH value of the reaction mixture is maintained constant between 5.0 and 6.0 After about one hour the condensation is finished, and the primary condensation product is in solution. There is then added an aqueous solution which contains 4 parts of ammonia. The reaction mixture is heated to 40° C. and stirred for 2 hours at that temperature. By the addition of sodium chloride the secondary condensation product is precipitated at a pH value of 7.5, filtered off and dried at 60° C. The dyestuff is a yellow powder which dyes cellulose fibers from alkaline baths having a high salt concentration full yellow tints which are fast to washing.

A similar yellow dyestuff is obtained by using as starting material an amino-monoazo-dyestuff of the formula

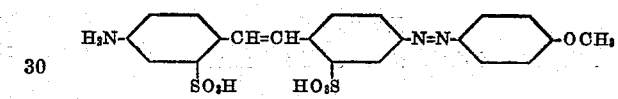

or

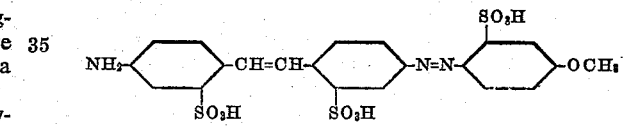

and otherwise proceeding in the manner described in this example.

The same dyestuff can be obtained by carrying out the condensations with cyanuric chloride in the reverse order of succession, that is to say, instead of first condensing the cyanuric chloride with the amino-azo-dyestuff, there may be used as starting material the primary condensation product of the formula

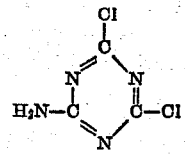

and reacting it at about 40° C. with the amino-azo-dyestuff.

Example 11

2 parts of the dyestuff of the formula

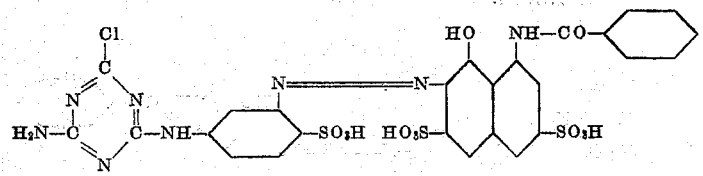

are dissolved in 100 parts of water by the addition of 1 part of sodium hydroxide. A cotton fabric is impregnated with the solution at room temperature, then squeezed to a weight increase of 70% and dried. The fabric is then steamed for 60 seconds, rinsed, soaped for 15 minutes in a boiling solution of about 0.3% strength of a non-ionic detergent, rinsed and dried. There is obtained a blue-red dyeing which is fast to washing and light.

Example 12

2 parts of the dyestuff of the formula

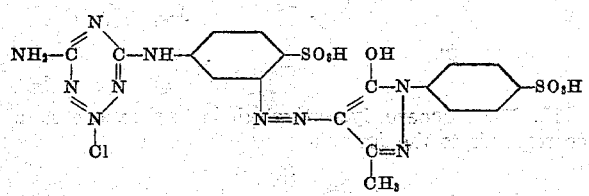

are dissolved in 100 parts of water. A fabric of staple fibers of regenerated cellulose is impregnated with the resulting solution so that its weight increase amounts to 75%, and is then dried.

The fabric is subsequently impregnated with a solution having a temperature of 20° C., which contains, per liter, 10 grams of sodium hydroxide and 300 grams of sodium chloride, the fabric is squeezed to a weight increase of 75% and the dyeing is steamed for 60 seconds at 100–101° C., rinsed, soaped for a ¼ hour in a boiling solution of 0.3% strength of a non-ionic detergent, rinsed and dried. There is obtained a yellow dyeing which is fast to light and washing.

By using, instead of a fabric of staple fibers of regenerated cellulose, a cotton fabric, a similar good result is obtained.

What is claimed is:

1. A water-soluble azo dyestuff of the formula

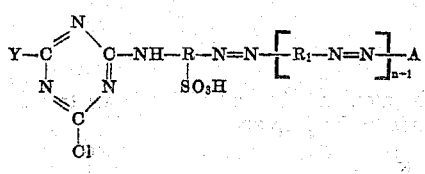

wherein A represents the radical of a coupling component containing a water-solubilizing group and also a member selected from the group consisting of the hydroxyl and amino groups, said radical being bound to the adjacent azo linkage in a position vicinal to said member and being selected from the group consisting of pyrazolone, quinoline, benzene and naphthalene radicals, $n$ represents a whole positive number up to 2, $R_1$ represents a member selected from the group consisting of a benzene and a naphthalene radical, R represents a benzene radical, and Y represents a member selected from the group consisting of the $NH_2$— group, the radical of a primary aliphatic amine having less than 12 carbon atoms and bound to the triazine nucleus by its nitrogen atom, the radical of an aromatic at most bicyclic amino sulfonic acid bound to the triazine nucleus by its amino group, and the radical of an aminobenzene-carboxylic acid bound to the triazine nucleus by its amino group.

2. An azo dyestuff according to claim 1, wherein $n$ is 1.

3. A water-soluble monoazo dyestuff which in its free acid state corresponds to the formula

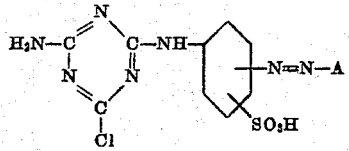

wherein A represents the radical of a coupling component containing an hydroxyl group and at least one member selected from the group consisting of a sulfonic and a carboxylic acid group, said radical being bound to the azo linkage in vicinal position to said hydroxy group and being selected from the group consisting of pyrazolone, quinoline, benzene and naphthalene radicals.

4. A water-soluble monoazo dyestuff which in its free acid state corresponds to the formula

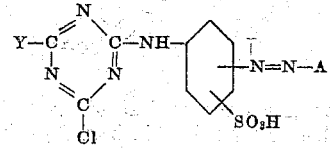

wherein A represents the radical of a coupling component containing an hydroxyl group and at least one member selected from the group consisting of a sulfonic and a carboxylic acid group, said radical being bound to the azo linkage in vicinal position to said hydroxy group and being selected from the group consisting of pyrazolone, quinoline, benzene and naphthalene radicals, and Y represents the radical of an aminobenzene sulfonic acid.

5. A water-soluble monoazo dyestuff which in its free acid state corresponds to the formula

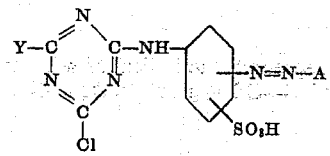

wherein A represents the radical of a 5-pyrazolone bound to the azo group in 4-position and Y represents the radical of an aminobenzene sulfonic acid bound by its amino group to the triazine nucleus.

6. A water-soluble monoazo dyestuff which in its free acid state corresponds to the formula

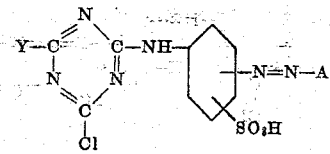

wherein A represents the radical of a hydroxynaphthalene sulfonic acid bound to the azo linkage in vicinal position

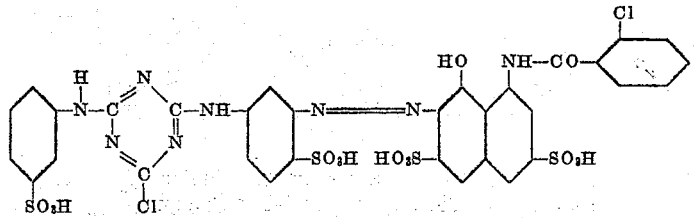

of the hydroxyl group and Y represents the radical of an aminobenzene sulfonic acid bound by its amino group to the triazine nucleus.

7. A water-soluble monoazo dyestuff which in its free acid state corresponds to the formula

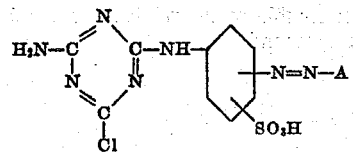

wherein A represents the radical of an acylamino hydroxynaphthalene disulfonic acid bound to the azo linkage in a position vicinal to the hydroxy group and Y the $NH_2$ group.

8. A water-soluble monoazo dyestuff which in its free acid state corresponds to the formula

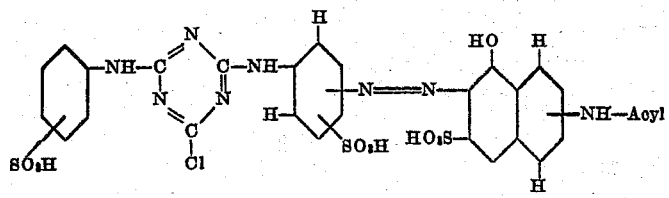

wherein Acyl represents the radical of a lower carboxylic acid bound by its —CO— group to the —NH— group.

9. A water-soluble monoazo dyestuff which in its free acid state corresponds to the formula

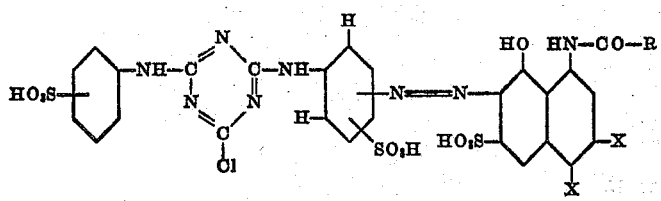

wherein R represents a benzene radical, one of the X's a hydrogen atom and the other X a sulfonic acid group.

10. The monoazo dyestuff which in its free acid state corresponds to the formula

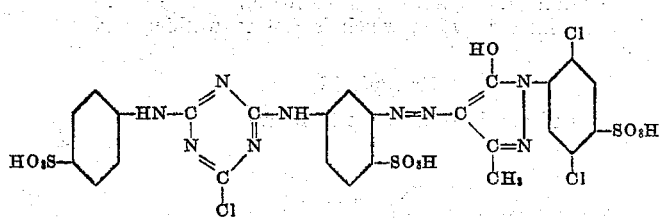

11. The monoazo dyestuff which in its free acid state corresponds to the formula

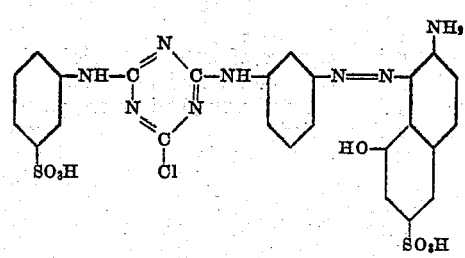

12. The monoazo dyestuff which in its free acid state corresponds to the formula 13. The monoazo dyestuff which in its free acid state corresponds to the formula

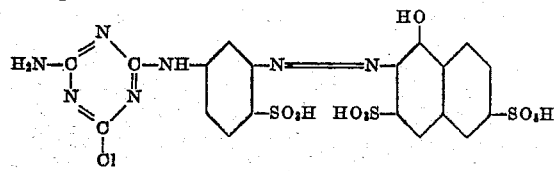

14. The monoazo dyestuff which in its free acid state corresponds to the formula
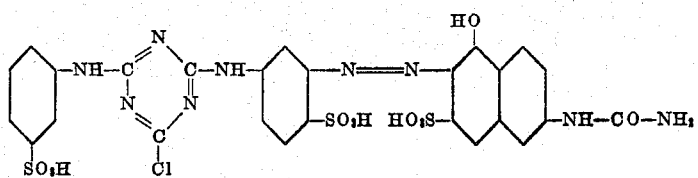
References Cited in the file of this patent
UNITED STATES PATENTS
| | | |
|---|---|---|
| 2,553,261 | Knecht et al. | May 15, 1951 |
| 2,653,149 | Riat | Sept. 22, 1953 |
| 2,679,499 | Long et al. | May 25, 1954 |
| 2,795,576 | Fasciati | June 11, 1957 |
| 2,820,785 | Zollinger et al. | Jan. 21, 1958 |
FOREIGN PATENTS
| | | |
|---|---|---|
| 87,735 | Norway | July 23, 1956 |

UNITED STATES PATENT OFFICE
Certificate of Correction

Patent No. 2,945,021  
July 12, 1960

Alfred Fasciati et al.

It is hereby certified that error appears in the above numbered patent requiring correction and that the said Letters Patent should read as corrected below.

Columns 9 and 10, opposite "18", under the column headed "II", the third formula should appear as shown below instead of as in the patent:

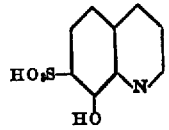

column 23, lines 47 to 52, the left-hand portion of the formula should appear as shown below instead of as in the patent:

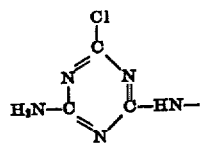

same column 23, lines 57 to 63, the right-hand middle portion of the formula should appear as shown below instead of as in the patent:

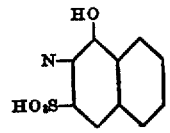

column 25, lines 24 to 32, Example 12, the left-hand portion of the formula should appear as shown below instead of as in the patent:

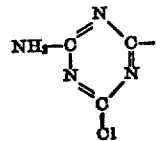

column 27, lines 44 and 45, strike out "and Y the $NH_2$ group".

Signed and sealed this 30th day of May 1961.

[SEAL]

Attest:  
ERNEST W. SWIDER,  
*Attesting Officer.*

DAVID L. LADD,  
*Commissioner of Patents.*

UNITED STATES PATENT OFFICE
CERTIFICATE OF CORRECTION

Patent No. 2,945,021                      July 12, 1960

Alfred Fasciati et al.

It is hereby certified that error appears in the above numbered patent requiring correction and that the said Letters Patent should read as corrected below.

Column 28, lines 34 to 44, the formula should appear as shown below instead of as in the patent:

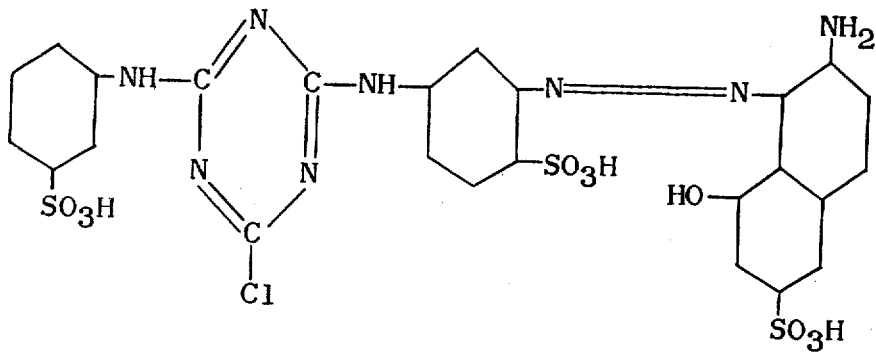

Signed and sealed this 9th day of January 1962.

(SEAL)
Attest:
ERNEST W. SWIDER
Attesting Officer

DAVID L. LADD
Commissioner of Patents